United States Patent
Seets et al.

(10) Patent No.: US 8,808,524 B2
(45) Date of Patent: Aug. 19, 2014

(54) DIRECT ELECTRODEPOSITION OF MAGNETIC RECORDING HEAD FEATURES

(75) Inventors: David Christopher Seets, Excelsior, MN (US); James Keith Price, Excelsior, MN (US); Mary Elizabeth Leamont, Minneapolis, MN (US); Ibro Tabakovic, Edina, MN (US); Steven Carl Riemer, Minneapolis, MN (US); Tracy Charles Baresh, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 607 days.

(21) Appl. No.: 12/360,140

(22) Filed: Jan. 27, 2009

(65) Prior Publication Data

US 2010/0187120 A1    Jul. 29, 2010

(51) Int. Cl.
*C25D 5/02* (2006.01)

(52) U.S. Cl.
USPC ............ 205/119; 205/255; 205/258; 360/110

(58) Field of Classification Search
USPC ......... 205/119; 360/110, 119.01, 125.03, 328
See application file for complete search history.

(56) References Cited

U.S. PATENT DOCUMENTS

| | | | | |
|---|---|---|---|---|
| 5,670,034 | A * | 9/1997 | Lowery | 205/143 |
| 5,809,637 | A * | 9/1998 | Rottmayer | 29/603.15 |
| 5,883,762 | A * | 3/1999 | Calhoun et al. | 205/119 |
| 6,466,416 | B1 * | 10/2002 | Honjo et al. | 360/317 |
| 6,513,228 | B1 * | 2/2003 | Khizroev et al. | 29/603.14 |
| 6,807,027 | B2 | 10/2004 | McGeehin et al. | |
| 6,959,483 | B2 * | 11/2005 | Crue et al. | 29/603.13 |
| 7,095,591 | B2 | 8/2006 | Imamura et al. | |
| 7,233,457 | B2 | 6/2007 | Johnston et al. | |
| 7,288,333 | B2 | 10/2007 | Kawasaki et al. | |
| 2002/0071208 | A1 | 6/2002 | Batra et al. | |
| 2004/0196589 | A1 * | 10/2004 | Lille | 360/125 |
| 2004/0264062 | A1 | 12/2004 | Price et al. | |
| 2005/0034789 | A1 * | 2/2005 | Yazawa | 148/312 |
| 2006/0002024 | A1 | 1/2006 | Le et al. | |
| 2007/0030602 | A1 * | 2/2007 | Matono | 360/317 |
| 2007/0115584 | A1 | 5/2007 | Balamane et al. | |
| 2007/0165330 | A1 | 7/2007 | Yamaguchi et al. | |
| 2007/0186408 | A1 | 8/2007 | Nix et al. | |
| 2008/0072417 | A1 | 3/2008 | Hsu et al. | |
| 2008/0225426 | A1 | 9/2008 | Roy et al. | |
| 2008/0232001 | A1 * | 9/2008 | Bonhote et al. | 360/319 |
| 2009/0246715 | A1 * | 10/2009 | Kouchi et al. | 430/324 |
| 2009/0310262 | A1 * | 12/2009 | Wu et al. | 360/319 |

FOREIGN PATENT DOCUMENTS

JP         09190918 A  *  7/1997

OTHER PUBLICATIONS

Machine Translation of JP09-190918A.*
English Abstract of JP 2002-298310.*

* cited by examiner

*Primary Examiner* — Bryan D. Ripa
(74) *Attorney, Agent, or Firm* — Hall Estill ATtorneys at Law (57) ABSTRACT

A method is described for forming a magnetic recording head substrate. The method includes utilizing a metal feature on the magnetic recording head substrate as a grounding path. The magnetic recording head substrate is submerged in a solution containing ions of a second material, and the ions of the second material are electrodeposited on the magnetic recording head substrate.

8 Claims, 7 Drawing Sheets

DIRECT ELECTRODEPOSITION OF MAGNETIC RECORDING HEAD FEATURES

BACKGROUND

Magnetic recording heads typically include both a write element and a read element. The read element includes a magnetoresistive (MR), tunneling magnetoresistive (TMR) or giant magnetoresistive (GMR) element for reading information from a recording layer of a recording medium (e.g., a magnetic disc). The write element is configured to generate magnetic fields that align magnetic moments of the recording data to represent bits of data.

The write portion of a magnetic recording head can include at least two poles, a main pole and at least one return pole. The main pole and return pole can be separated by a gap layer at the surface facing the recording medium. One or more layers of conductive coils are positioned between the main and return poles, and are encapsulated by insulating layers.

To write data to the recording medium, an electric current is applied to the conductive coils to induce a magnetic field in the media under the main pole. By reversing the direction of the current through the coils, the polarity of the data written to the media is reversed, and a magnetic transition is written between two adjacent bits. The magnetic signals are conducted through the trailing edge of the main pole in a manner that orients the magnetic moments of the recording medium perpendicularly to the surface of the recording media.

SUMMARY

A method is described for forming a magnetic recording head. In accordance with some embodiments, the method generally comprises forming a first metal feature on a substrate. The substrate and the formed first metal feature are submerged in a solution comprising ions of a deposition material, and the ions of the deposition material are electrodeposited directly on the first metal feature without the use of an intervening seed layer.

BRIEF DESCRIPTION OF THE DRAWINGS

FIG. 3A-FIG. 8B illustrate the process to form the write element shown in FIG. 2.

DETAILED DESCRIPTION

Figure 1:
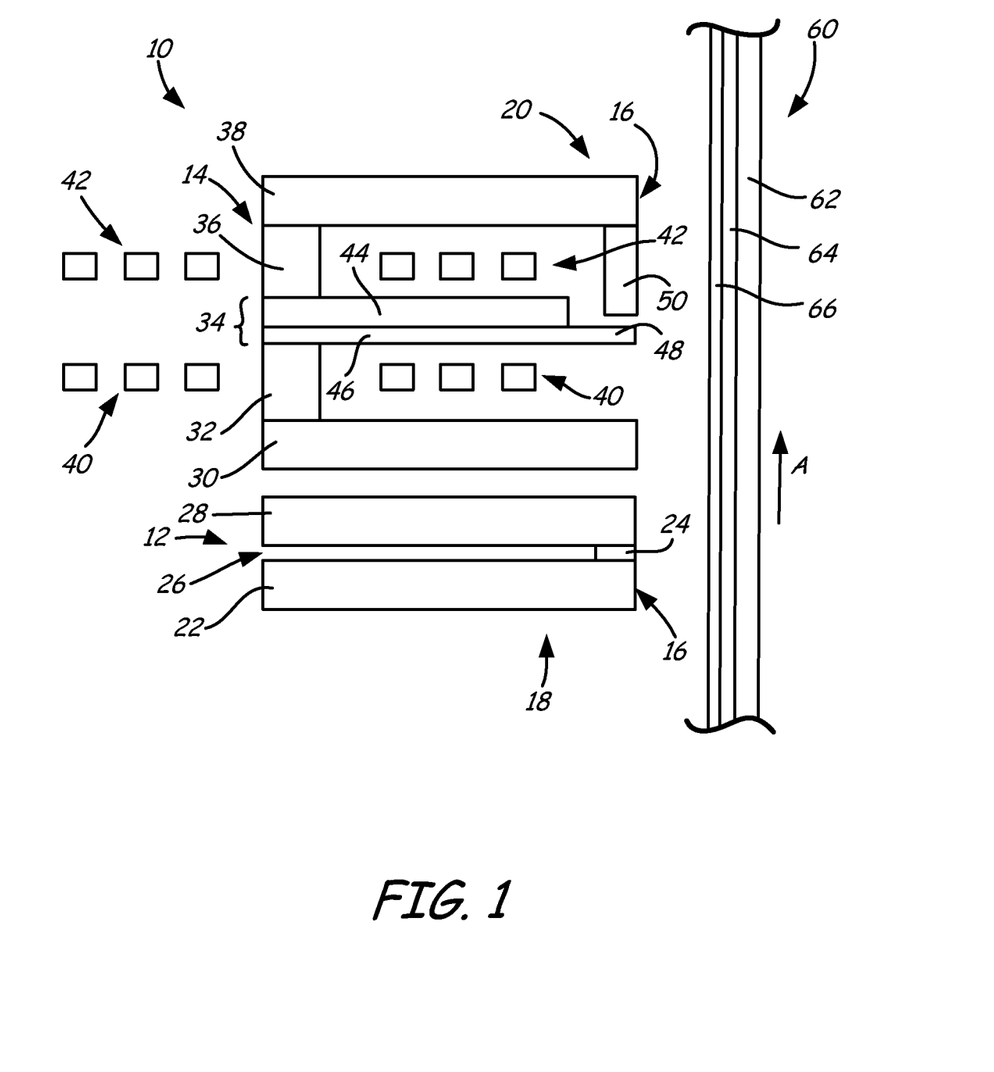
FIG. 1 is a cross-sectional view of a recording head taken substantially normal to a magnetic medium.

FIG. 1 is a cross-sectional view of recording head 10, which includes reader 12 and writer 14 that define medium confronting surface 16. Reader 12 and writer 14 each have medium confronting surface 16, leading edge 18 and trailing edge 20. Reader 12 includes bottom shield structure 22, read element 24, read gap 26, and top shield structure 28. Writer 14 includes first return pole 30, first magnetic stud 32, main pole 34, second magnetic stud 36, second return pole 38, first conductive coil 40, and second conductive coil 42. Main pole 34 includes yoke 44, main pole body 46 and main pole tip 48. Front shield 50 shields main pole 34.

Reader 12 and writer 14 are multi-layered devices having features formed by layered materials. In one example, as illustrated in FIG. 1, writer 14 is stacked on reader 12 in a piggyback configuration in which layers are not shared between the two elements. In other examples, reader 12 and writer 14 can be arranged in a merged-head configuration (in which layers are shared between the two elements) and/or reader 12 may be formed on writer 14.

On reader 12, read gap 26 is defined on medium confronting surface 16 between terminating ends of bottom shield 22 and top shield 28. Read element 24 is positioned in read gap 26 adjacent medium confronting surface 16. Read gap 26 insulates read element 24 from bottom shield 22 and top shield 28. Read element 24 may be any variety of different types of read elements, such as a magnetoresistive (MR) element, a tunneling magnetoresistive (TMR) read element or a giant magnetoresistive (GMR) read element.

Recording head 10 confronts magnetic medium 60 at medium confronting surface 16, such as an air bearing surface (ABS). Magnetic medium 60 includes substrate 62, soft underlayer (SUL) 64, and medium layer 66. SUL 64 is disposed between substrate 62 and medium layer 66. Magnetic medium 60 is positioned proximate to recording head 10 such that the surface of medium layer 66 opposite SUL 64 faces reader 12 and writer 14.

Reader 12 and writer 14 are carried over the surface of magnetic medium 60, which is moved relative to recording head 10 as indicated by arrow A such that main pole 34 trails first return pole 30 and leads second return pole 38. Reader 12 and writer 14 each have leading edge 18 and trailing edge 20 defined by the movement of magnetic medium 60. Main pole 34 is used to physically write data to magnetic medium 60. In order to write data to magnetic medium 60, current is caused to flow through second conductive coil 42. The magnetomotive force in the coils causes magnetic flux to travel from main pole tip 48 perpendicularly through medium layer 66, across SUL 64, and through second return pole 38 and second magnetic stud 36 to provide a closed magnetic flux path. The direction of the write field at the medium confronting surface of main pole tip 48, which is related to the state of the data written to magnetic medium 60, is controllable based on the direction that the current flows through second conductive coil 42.

Reader 12 reads data from magnetic medium 60. In operation, magnetic flux from a surface of magnetic medium 60 causes rotation of a magnetization vector of read element 24, which in turn causes a change in electrical resistivity of read element 24. The change in resistivity of read element 24 can be detected by passing a current through read element 24 and measuring a voltage across read element 24. Shields 22 and 28, which may be made of a soft ferromagnetic material, guide stray magnetic flux from medium layer 66 away from read element 24 outside the area of medium layer 66 directly below read element 24.

In writer 14, first return pole 30, second return pole 38, first magnetic stud 32, and second magnetic stud 36 can comprise soft magnetic materials, such as NiFe. Conductive coils 40 and 42 can comprise a material with low electrical resistance, such as Cu. Main pole body 44 can comprise a high moment soft magnetic material, such as CoFe. First conductive coil 40 surrounds first magnetic stud 32, which magnetically couples main pole 34 to first return pole 30. Second conductive coil 42 surrounds second magnetic stud 36, which magnetically couples main pole 34 to second return pole 38. First conductive coil 40 passes through the gap between first return pole 30 and main pole 34, and second conductive coil 42 passes through the gap between main pole 34 and second return pole 38.

Magnetic medium 60 is shown merely for purposes of illustration, and may be any type of medium that can be used in conjunction with recording head 10, such as composite media, continuous/granular coupled (CGC) media, discrete track media, and bit-patterned media.

Reader 12 and writer 14 are shown merely for purposes of illustrating a construction that may be used in a recording head 10 and variations on the designs may be made. For example, a single trailing return pole may be provided on writer 14 instead of the shown dual return pole writer configuration.

The features of reader 12 and writer 14 are built-up in layers on a substrate or wafer using thin film process techniques. For example, the features of writer 14 can be built-up in layers beginning at leading edge 18 so that first return pole 30 is deposited on a wafer, first conductive coils 40 are deposited on first return pole 30 and so forth.

Some features of reader 12 and writer 14 are deposited by electrodeposition. Electrodeposition techniques use electrical energy and potential gradients to deposit cations onto electrical conductive (i.e. metallic) portions of a substrate. Previously, a seed layer consisting of electrically conductive material was sputter deposited on the substrate in order to provide a conductive base for electrodeposition. When used, a seed layer is deposited across the width of the wafer, which results in a lengthy grounding path that may have a resistance decrease from the edge to the center of the wafer. Additionally, the resistance decrease may limit the current available for electrodeposition and result in an electrodeposited layer of non-uniform thickness. The use of a seed layer as the grounding vehicle also requires numerous processing steps, including seed layer deposition, photolithography and liftoff processes. Furthermore, following electrodeposition, a residual seed layer that plays no role in the performance of the reader or writer remains under the electrodeposited feature and is present at the finished surface (i.e. medium confronting surface). This residual material can be detrimental to the downstream reliability of the device. For example, the residual seed layer may provide a site for corrosion. A seed layer can even be detrimental after being milled. For example, a seed layer may be deposited on a write pole, electroplated on, and then the seed layer and the electroplated layer may be milled to the desired pattern. However, the milling does not completely remove the seed layer at the milled edges. For example, shadowing may leave behind seed layer tags. Similar to the seed layer in general, these seed layer tags may provide a site for corrosion.

The current process utilizes a metal feature on the reader or writer as a grounding path to directly electrodeposit on that feature, thus eliminating intervening seed layers. Two example processes using direct deposition will be described, direct deposition of a conformal spacer and direct deposition to form a breakpoint. Although both example processes involve direct deposition on a main pole, the direct electrodeposition process is not limited to use on a main pole and may be used with any metal feature present on reader 12 or writer 14.

Figure 2:
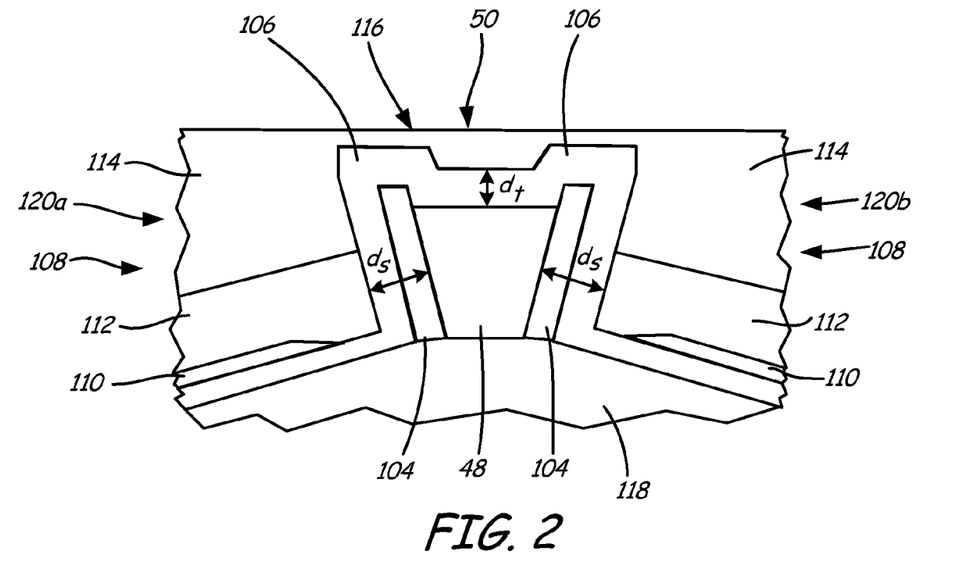
FIG. 2 is a cross-sectional view of a write element having direct deposited conformal spacers.

FIG. 2 is a cross-sectional view of a write element which includes main pole 48, conformal spacers 104, insulating layer 106, side shields 108 (having seed layer 110, first layer 112 and second layer 114) and front shield 50. For convenience, the write element will be referred to as having top 116, bottom 118 and first and second sides 120a and 120b (referred to generally as sides 120). Main pole 48 is made of a magnetic material. For example, main pole 48 can be formed from a high moment soft magnetic material such as CoFe. Main pole 48 can be formed by sputter deposition on a wafer as will be described below.

Conformal spacers 104 are formed on first and second sides 120a and 120b of main pole 48. Conformal spacers 104 are formed from any non-magnetic metal or metal alloy, such as NiP. Conformal spacers 104 are formed through direct electrodeposition on main pole 48. The thickness, rate of deposition and composition of conformal spacers 104 can be controlled by varying the deposition conditions.

The deposited material of conformal spacers 104 should be nonmagnetic to minimize adjacent track interference (ATI). This should be considered with selecting ions to deposit. Additionally, conditions, such as current density, should be controlled during electrodeposition to prevent the deposited material from becoming magnetic.

Conformal spacers 104 have a uniform thickness which allows side shields 108 to be located a uniform distance from main pole 48. The depositing material should be chosen to allow controlled and uniform deposition of conformal spacers 104. Conformal spacers 104 also are uniform in structure. That is, the depositing material should be selected so that it is either amorphous or nanocrystalline when deposited.

It is beneficial, but not required, that conformal spacers 104 have mechanical properties, such as hardness and coefficient of thermal expansion, similar to other features on main pole 48. Main pole 48 may be further processed downstream, such as lapped. Therefore, the material to be deposited may be chosen so that conformal spacers 104 have properties, such as hardness and coefficient of thermal expansion, similar to main pole 48 and other features on the writer. Finally, the conformal spacers 104 should be formed of material that is electrochemically compatible with the adjacent main pole 48.

Insulating layer 106 covers top 116 and sides 120 of conformal spacers 104 and main pole 48. Alternatively, sides 120 can be masked so that insulating layer 106 is only deposited on top 116. Insulating layer 106 is non-magnetic and electrically insulating. Together conformal spacers 104 and insulating layer 106 protect main pole 48 from magnetic side shields 108.

Side shields 108 are formed on sides 120 of insulating layer 106, and front shield 50 is formed on top 116 of insulating layer 106. Side shields 108 include seed layer 110, first layer 112 and second layer 114. First layer 112 and second layer 114 can be formed from the same or different magnetic materials. As illustrated, second layer 114 may continue to top 116 to form front shield 50. Side shields 108 and front shield 50 minimize fringing fields from the write element in tracks adjacent to the track being written, thus reducing adjacent track interference (ATI).

Side gap $d_s$ is the distance between main pole 48 and side shield 108. Top gap $d_t$ is the distance between main pole 48 and front shield 50. Conformal spacers 104 allow side gap $d_s$ to be controlled. The uniform shape and size of direct electrodeposited conformal spacers 104 creates uniform and consistent side gaps $d_s$. By having conformal spacers 104 only on sides 120 of main pole 48, side gap $d_s$ and top gap $d_t$ can be independently controlled. In one example, conformal spacers 104 allow side gap $d_s$ to be thicker than gap $d_t$, as may be desired for certain applications.

Figure 3A:
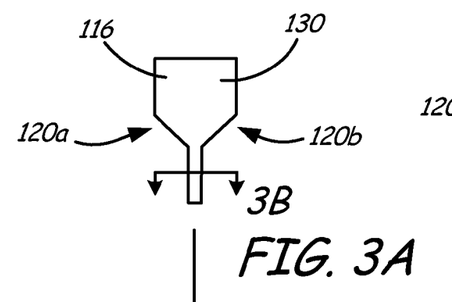

FIG. 3A-FIG. 8B illustrate the method of forming the write element of FIG. 2. FIG. 3B-FIG. 8B are cross-sections of FIG. 3A-FIG. 8A respectively. As shown in FIGS. 3A and 3B, the process begins with a fabricated main pole 48 having mask 130. In one example, main pole 48 is formed by sputter depositing high moment magnetic material on a wafer. Sputter deposition is followed by photolithography and milling processes to remove extraneous sputter deposited material. In one example, the high moment magnetic material has a magnetic moment of at least 2.0 tesla (T). In another example, the high moment magnetic material has a magnetic moment of about 2.2 T to about 2.4 T. Example high moment magnetic materials include CoFe, CoFeNi, CoFeRh, CoFeRu, CoFePt, CoFePd and NiFe.

Figure 3B:
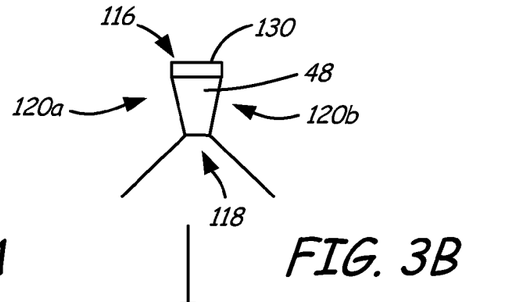

Mask 130 covers top 116 of main pole 48; mask 130 is not present on sides 120. Mask 130 can be any non-conductive material so that mask 130 prevents electrodeposition on the covered area. In one example, mask 130 contains carbon.

Figure 4A:
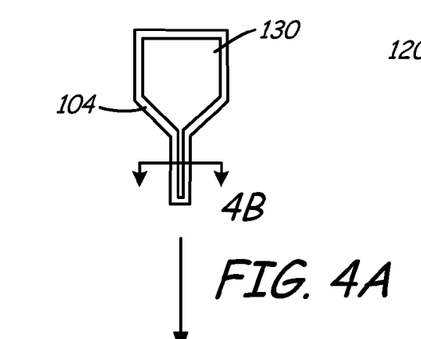
Figure 4B:
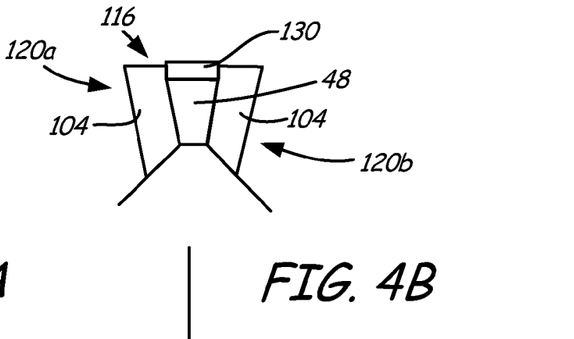

Next, as shown in FIGS. 4A and 4B, conformal spacers 104 are formed on sides 120a, 120b of main pole 48. Conformal spacers 104 are formed by direct electrodeposition of non-magnetic second metal ions on to main pole 48. In one example, nickel phosphorous is deposited on main pole 48. Electrodeposition techniques use electrical energy and potential gradients to deposit second metal ions onto electrical conductive (i.e. metallic) portions of a substrate. Ions will not deposit onto non-conductive portions (i.e. masked portions) of the substrate. Conditions should be controlled during electrodeposition so that conformal spacers 104 are non-magnetic. In one example, a current density of about 1.7 to about 11 milliamp/cm$^2$ was applied. In another example, a current density of about 1.7 to about 5.8 milliamp/cm$^2$ was applied. In a further example, the current density applied was about 5.8 milliamp/cm$^2$. The current density must be low enough to prevent magnetization of the deposited material while being high enough to plate in a reasonable amount of time. The direct electrodeposition of second metal ions will be described further below.

Figure 5A:
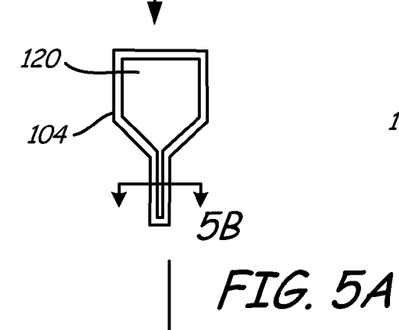
Figure 5B:
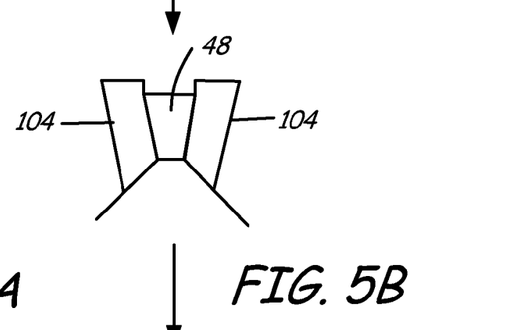

Following electrodeposition of conformal spacers 104, mask 130 can be removed as shown in FIGS. 5A and 5B. Mask 130 may be removed by inductively coupled plasma (ICP) etching. In an alternative process, the process is continued without removing mask 130 after electrodeposition of conformal spacers 104.

Figure 6A:
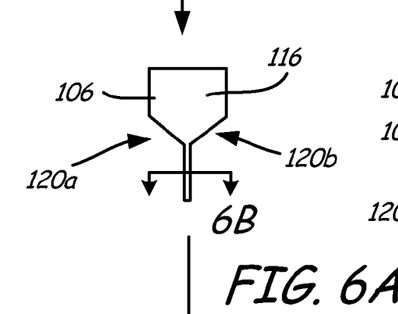
Figure 6B:
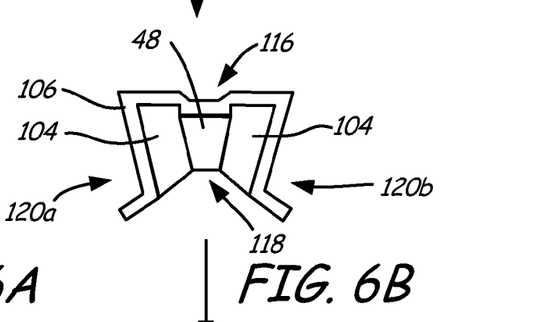

Next, as shown in FIG. 6A, insulating layer 106 is deposited over main pole 48 and conformal spacers 104. Insulating layer 106 must be formed from a non-conductive material. In one example, alumina is sputter deposited over top 116 and sides 120 of main pole 48 and conformal spacers 104 as illustrated in FIG. 6B. Alternatively, a photomask process can be applied so that alumina is only sputter deposited over top 116 of main pole 48 and conformal spacers 104. Together insulating layer 106 and conformal spacers 104 insulate main pole 48 from side shields 108, which are magnetic.

Figures 7A, 7B:
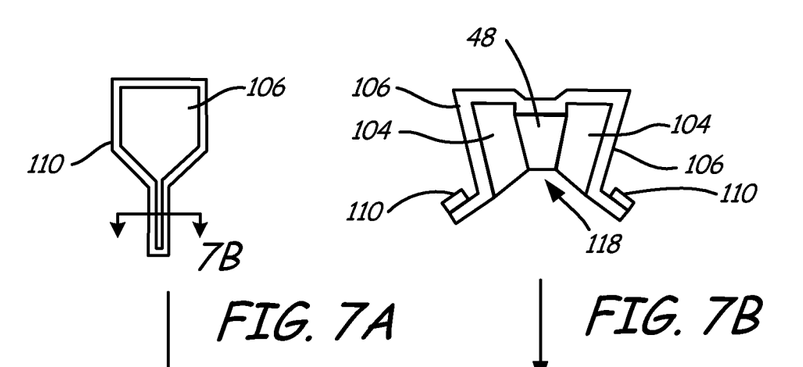

Optionally, side shields 108 may be formed on insulating layer 106. Formation of side shields 108 includes deposition of seed layer 110 and at least one electrodeposition of a side shield layer (such as first layer 112). FIGS. 7A and 7B show sputter deposited seed layer 110. Seed layer 110 is formed from a conductive material. A PMGI resist may be coated, exposed and developed on top 116 of insulating layer 106 prior to sputter depositing seed layer 110 to prevent seed layer 110 from depositing on top 116 of insulating layer 106. After deposition of seed layer 110, the resist can be removed.

Figures 8A, 8B:
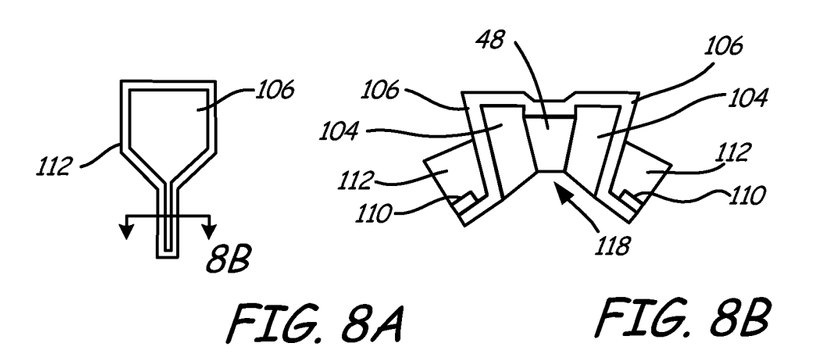

FIGS. 8A and 8B show that first layer 112 metal ions have been electrodeposited on seed layer 110 to form first layer 112 of side shield 108. As previously discussed, metal ions are deposited on conductive surfaces during electrodeposition. Insulating layer 108 is not conductive, therefore, metal ions will only deposit on conductive seed layer 110. A second layer of metal ions may be electrodeposited on first layer 112 to form second layer 114 as shown in FIG. 2. Side shields 108 may be of any configuration. For example, side shields 108 may only include first layer 112. Additionally, the height of first layer 112 and second layer 114 are illustrative only. The proportions of first layer 112 and second layer 114 can be varied depending upon the application.

As described above, side shields 108 and front shield 50 may be formed on insulating layer 106. Alternatively, side shields 108 may be formed immediately adjacent to conformal spacers 104, so that insulating layer 106 is not present. In this case, seed layer 110 can be sputter deposited on the substrate and side shields 108 may be electrodeposited thereon.

Main pole 48 with electrodeposited non-magnetic conformal spacers 104 and magnetic side shields 108 and front shield 50 minimizes fringing fields from main pole 48 in tacks adjacent to the track being written, thus reducing adjacent track interference (ATI). Direct electrodeposition of conformal spacers 104 provides side gaps of a controlled and uniform thickness. Additionally, conformal spacers 104 coherently cover the sides of main pole 48.

Figure 9A:
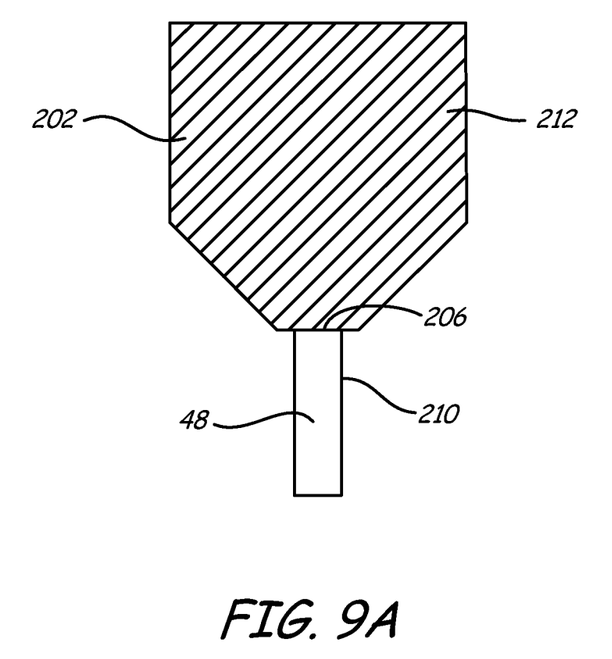
FIG. 9A is a top view of a main pole have a direct deposited second magnetic material.
Figure 9B:
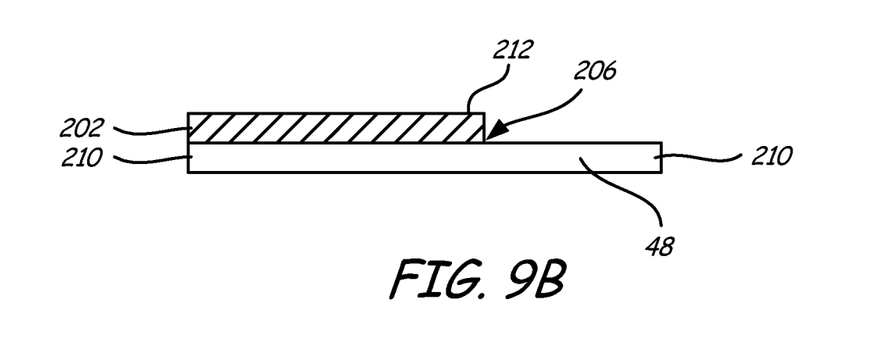
FIG. 9B is a cross-sectional view of the main pole of FIG. 9A.

A second method of direct electrodeposition involves direct electrodeposition of a high moment magnetic material to form a sharp, crisp breakpoint. FIG. 9 illustrates a main pole having paddle 202, tip 48 and breakpoint 206. Tip 48 is formed from first magnetic material 210. Paddle 202 is formed from first magnetic material 210 and second magnetic material 212. Second magnetic material 212 is deposited on paddle 202 to increase the surface area of paddle 202. Breakpoint 206 is located where paddle 202 meets tip 48, near where paddle 202 narrows. In use, paddle 202 catches or gathers the magnetic field from the surrounding coils and funnels the magnetic field onto a spot on the media.

Second magnetic material 212 is directly electrodeposited on first magnetic material 210. Direct electrodeposition causes a sharp transition at breakpoint 206 between first magnetic material 210 and second magnetic material 212. In contrast, a gradual increase in material was seen at previous breakpoints. Additionally, direct deposition results in a breakpoint with no curvature. Curvature of the breakpoint results in sub-optimal delivery of flux to the write tip, thus resulting in an increased flux delivery to write tip 48.

First magnetic material 210 and second magnetic material 212 are formed of high moment or low moment magnetic materials. Example high moment magnetic materials include alloys of nickel, cobalt and iron and combinations thereof. In one example, the high moment magnetic material has a magnetic moment greater than about 2.0 T. In another example, the high moment magnetic material has a magnetic moment between about 2.2 T and about 2.4 T. First magnetic material 210 and second magnetic material 212 may be formed from the same magnetic material or may be formed from different magnetic materials.

Figure 10:
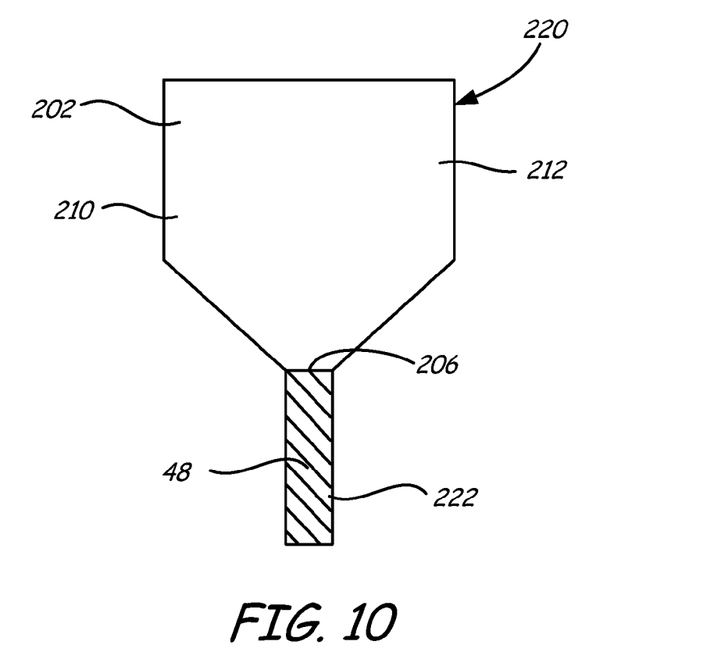
FIGS. 10 and 11 illustrate the process to form the main pole shown in FIGS. 9A and 9B.
Figure 11:
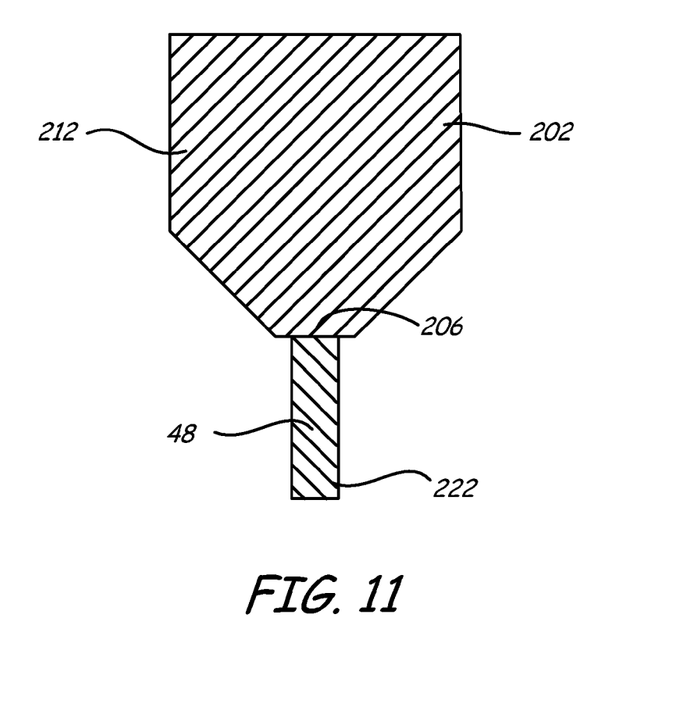

FIGS. 10 and 11 illustrate the process of making the write element shown in FIG. 9A. As illustrated in FIG. 10, the process begins by depositing mask 222 on fabricated main pole 220. Fabricated main pole 220 can be formed by sputter depositing first magnetic material 210 on a substrate. Sputter deposition is followed by photolithography and removal of extraneous sputter deposited material by milling processes. Mask 222 is formed from a non-conducting material and deposited on write tip 48 to prevent electrodeposition on write tip 48.

Next, as shown in FIG. 11, second magnetic material 212 is directly electrodeposited on first magnetic material 210. During electrodeposition, electric potential is used to deposit ions of second magnetic material 212 on the exposed, conducting surfaces of the main pole. Second magnetic material 212 will not be deposited on write tip 48 because of non-conductive mask 222. Second magnetic material 212 will deposit on conductive first magnetic material 210. Second magnetic material 212 is deposited on sides and top of paddle 202. In one example, a current density between about 1.9 and about 27 milliamp/cm$^2$ is applied during electrodeposition. In another example, a current density of about 8.3 milliamp/cm$^2$ is applied during electrodeposition. In a further example, the current density is chosen so that a reasonable deposition rate is achieved and the deposited layer is uniform and is not lumpy. The process of electrodeposition is described in further detail below.

After electrodeposition, mask 222 is removed to from pole tip 48 to form the write element of FIG. 9A. The resulting breakpoint 206 is well defined, with a sharp flare angle and little curvature. The physical width of the write element of FIG. 9A is uniform and therefore is independent of lapping sigma. Additionally, breakpoint 206 is dependent only on the placement of mask 222 in one direction. Therefore, the write element of FIG. 9A is less affected by the overlayer placement than previous applications which required the alignment of the mask with the substrate in at least two directions. Deposited second magnetic material 212 increases the surface area of paddle 202, enabling a higher flux concentration and increasing the flux delivery from paddle 202 to write tip 48.

Figure 12:
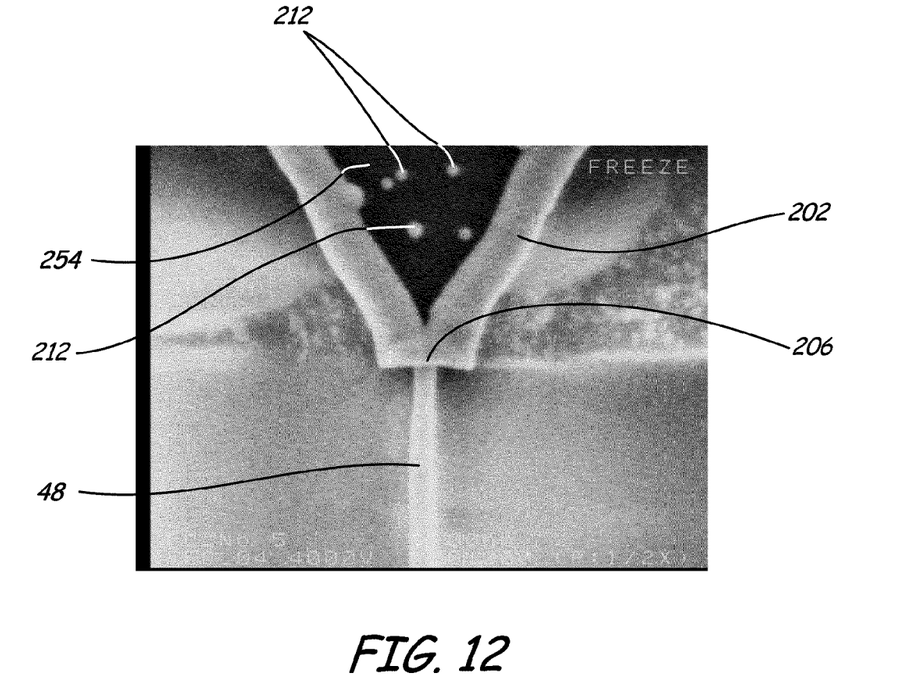
FIG. 12 is a top scanning electron microscope (SEM) image of a main pole having a direct deposited second magnetic material.

FIG. 12 is a top scanning electron microscope (SEM) image of a write element. As illustrated in FIG. 12, top of paddle 202 may be masked using photolithograph prior to electrodeposition. For example, top surface of paddle 202 can be masked with a non-conductive material 254 to prevent electrodeposition of second magnetic material 212 on top surface of paddle 202. FIG. 12 shows the sharp, crisp transition between paddle 202 and write tip 48 at breakpoint 206. It should be noted that the slight deposition of second magnetic material 212 on top of paddle 202 is due to the slight conductivity of mask 254, and can be eliminated through additional process optimization.

Figure 13:
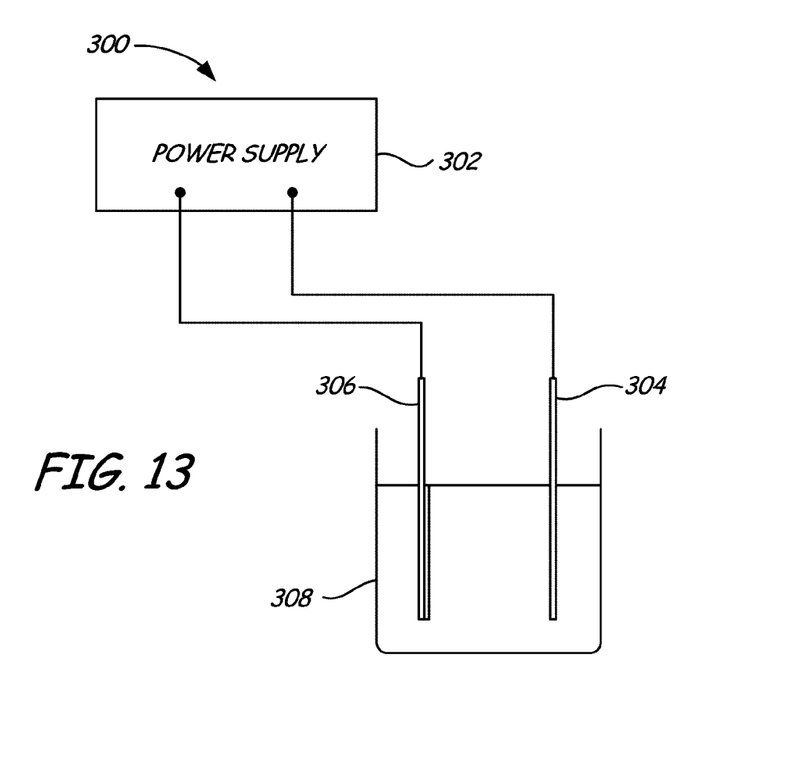
FIG. 13 is a schematic diagram illustrating an electrodeposition system.

Conformal spacers 104 and second magnetic layer 212 are directly electrodeposited on a main pole. As discussed above, electrodeposition techniques utilize electrical energy and potential gradients to deposit second metal ions on the main pole. FIG. 13 illustrates exemplary electrodeposition system 300. Electrodeposition system 300 includes power source 302, anode 304, cathode 306 and plating bath 308. Anode 304 and cathode 306 are connected to power supply 302. Cathode 306 has a negative charge and is the object to be plated. Plating bath 308 is a liquid solution that includes the second metal ions (i.e. nickel, phosphorus, iron, cobalt, nickel) to be plated. Plating bath 308 may also contain other additives to enhance or alter a characteristic of the deposited layer. To electrodeposit, cathode (i.e. main pole) 306 and anode 304 are submerged in or exposed to plating bath 308. Power supply 302 supplies electrical energy to electrodes 304, 306. The supplied electrical energy causes second metal ions to deposit on cathode 306.

When plating, cathode 306 must be grounded so that there is a return path for the electrons. For example, where cathode is a main pole, the main pole can be grounded directly to the substrate. Alternatively, the main pole can be grounded through other features to substrate or to the edge of the wafer. It should be noted that the metal feature to be plated on may be formed on a wafer containing a plurality of similar features, which will be separated in later processing. In this case, each metal feature can be connected to the power source either directly or indirectly. For example, each metal feature can be connected to a strap, which is connected to the power source.

Electroplating variables may be controlled to control the formation of conformal spacers 104. For example, the applied current density, the temperature and the pH of the plating bath may be controlled. The method of electroplating may also be controlled. In one example, hot plating was used, in which the current is turned on prior to submerging main pole 48 in the plating bath. Further, the composition of the plating bath may be controlled. In one example a NiP bath used to form conformal spacers 104 used a sulfate bath having additives selected to optimize stress, rate, roughness and nonmagnetic deposition.

EXAMPLE 1

A wafer containing a plurality of grounded write poles were submerged in a sulfate bath containing additives. The bath composition was: 6 g/L NaCl, 25 g/L $H_3BO_3$, 15 g/L $H_3PO_3$, 65 g/L $NiSO_4$, 0.8 g/L STI-1 and 0.1 g/L sodium lauryl sulfate (NaLS). STI-1 is a proprietary organic additive. STI-1 is an N-aromatic compound that forms complexes with Ni+2 ions in acidic solutions. Based on experimental work, it is believed that STI-1 increases the concentration of protons at the electrode surface through a catalytic mechanism. This is important when depositing NiP on a magnetic alloy because if the phosphorus content of the NiP at the interface with the write pole is too low, the NiP becomes magnetic. STI-1 prevents this problem because the STI-1 in the plating solution results in an increase in the phosphorus content in the NiP deposit. The presence of STI-1 also provides better current efficiency for NiP electrodeposition.

A current density of about 5.8 milliamps/cm2 was applied to the grounded write poles. The current density was applied before the wafer was submerged in the bath (a process known as hot plating). When the wafer was submerged in the bath, nonmagnetic NiP was plated on the exposed conductive surfaces of the wafer, such as the exposed metal sides of the write poles. The current density was applied for about 22.5 minutes and resulted in a NiP coating having a thickness of about 90 nm. The coating was uniform in shape (i.e. thickness) and form (i.e. amorphous, uniform NiP composition) and was non-magnetic.

EDX elemental profiles of NiP electrodeposited on a Cu plate show the maximum Ni and P are reached at the same distance from the interface, indicating that Ni and P are plated at proportional rates to achieve the final NiP composition.

EXAMPLE 2

A wafer containing a plurality of grounded write poles were submerged in a bath. In one example, the bath is composed of: 0.3M $NH_4Cl$, 0.4M $H_3BO_3$, 0.06M $CoSO_4.7H_2O$, 0.2M $NiSO_4.6H_2O$, between 0.005M and 0.07M $FeSO_4.H_2O$ and between 0.01 and 2.5 g/L additive(s). Example additives include ascorbic acid, saccharin, sodium lauryl sulfate, thiourea, and combinations thereof. Additives have been shown to increase the current efficiency for plating of CoNiFe films. The choice of additives has also been shown to dramatically change the alloy compositions of the plated CoNiFe films. Further, corrosion resistance of the plated CoNiFe film is influenced by the presence of impurities in the films, where the impurities were obtained by using different organic additives. Finally, the presence of additives affects the saturation magnetic flux density for the CoNiFe films.

A current density of about 8.3 milliamps/cm² was applied to the grounded write poles. The current density was applied before the wafer was submerged in the bath (a process known as hot plating). When the wafer was submerged in the bath, high moment magnetic CoNiFe alloy was plated on each grounded write pole. The current density was applied for about 1.5 to 9 minutes and resulted in a coating on each write pole having a thickness of about 90 nm. The coating was uniform in shape (i.e. thickness) and form (i.e. conformal and non-lumpy).

Although the present invention has been described with reference to preferred embodiments, workers skilled in the art will recognize that changes may be made in form and detail without departing from the spirit and scope of the invention. For example, the second metal ions may be plated on the same material or on a different material.

The invention claimed is:

1. A method of forming a magnetic recording head, comprising:
    forming a first metal feature of the magnetic recording head on a substrate by sputter depositing a sputter material onto the substrate and applying photolithography to the sputter deposited material to define the first metal feature with overall length and width dimensions; and then
    connecting the formed first metal feature to a power source;
    submerging the substrate with the formed first metal feature thereon in a solution comprising metal ions of a deposition material;
    electrodepositing the ions of the deposition material directly on the formed first metal feature to form a second metal feature that contactingly engages the first metal feature while using the first metal feature as an electrical grounding path for the power source, wherein no seed layer is present between the first and second metal features;
    depositing a mask before the electrodepositing step; and
    removing the mask after the electrodepositing step, wherein the first metal feature is characterized as a main pole and the second metal feature is characterized as a non-magnetic spacing layer contactingly engaging a side surface of the main pole.

2. The method of claim 1, wherein the connecting step comprises interconnecting the first metal feature to a terminal of the power source.

3. The method of claim 1, wherein the forming a first metal feature step comprises forming a plurality of spaced apart first features on the substrate, and the connecting step comprises concurrently connecting each of the plurality of first metal features to a terminal of the power source via a strap.

4. The method of claim 1, further comprising a subsequent step of sputter depositing a second sputter material on the second metal feature formed during the electrodeposition step.

5. The method of claim 1, wherein the first metal feature is formed of CoFe and the second metal feature is formed of NiP.

6. A method comprising:
    providing a magnetic writer structure comprising a main pole formed on a substrate by sputter depositing a magnetic sputter material onto the substrate and applying photolithography to the sputter deposited material to define the main pole with overall width and length dimensions on said substrate;
    interconnecting the main pole from the providing step to a terminal of a power source via an intervening electrically conductive path;
    exposing the magnetic writer structure to a mixture comprising ions of a deposition material; and
    electrodepositing the ions of the deposition material directly on the main pole using the main pole as an electrical grounding path for the power source to form a feature of the magnetic writer structure that contactingly engages the main pole, wherein a seed layer is not disposed between the main pole and the feature, wherein the feature is characterized as a first conformal layer contactingly engaging a first side of the main pole, and wherein the electrodepositing step further comprises concurrently forming a second conformal layer in contacting engagement with an opposing second side of the main pole.

7. The method of claim 6, wherein the electrodepositing step defines the formed feature with overall width and length dimensions.

8. The method of claim 6, wherein the electrodeposited deposition material is non-magnetic.

\* \* \* \* \*

UNITED STATES PATENT AND TRADEMARK OFFICE
CERTIFICATE OF CORRECTION

| | | |
|---|---|---|
| PATENT NO. | : 8,808,524 B2 | Page 1 of 1 |
| APPLICATION NO. | : 12/360140 | |
| DATED | : August 19, 2014 | |
| INVENTOR(S) | : David Christopher Seets et al. | |

It is certified that error appears in the above-identified patent and that said Letters Patent is hereby corrected as shown below:

In the Title Page:

Item (75) Inventors
replace "Mary Elizabeth Leamont"
with "Mary Elizabeth Learmont"

Signed and Sealed this
Seventeenth Day of February, 2015

Michelle K. Lee
*Deputy Director of the United States Patent and Trademark Office*